C. R. PFANDER.
REPEATING PUMP GUN CAMERA.
APPLICATION FILED AUG. 2, 1915.
1,190,000.
Patented July 4, 1916.
2 SHEETS—SHEET 1.
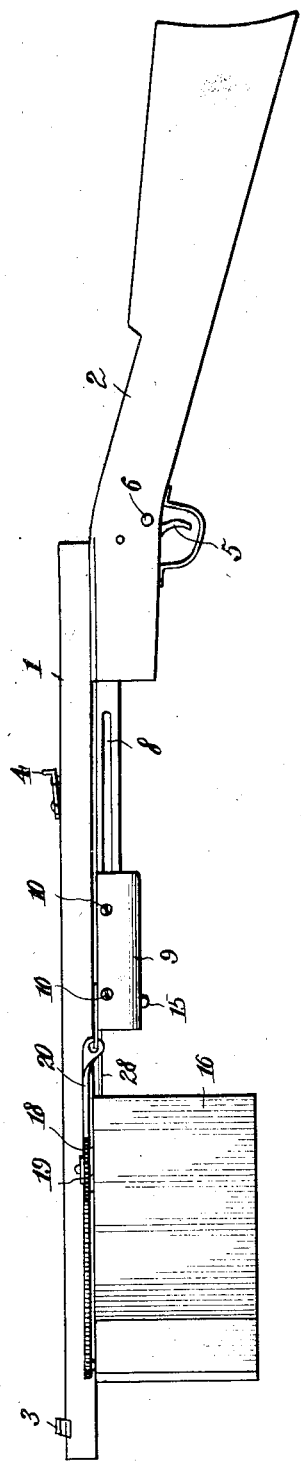
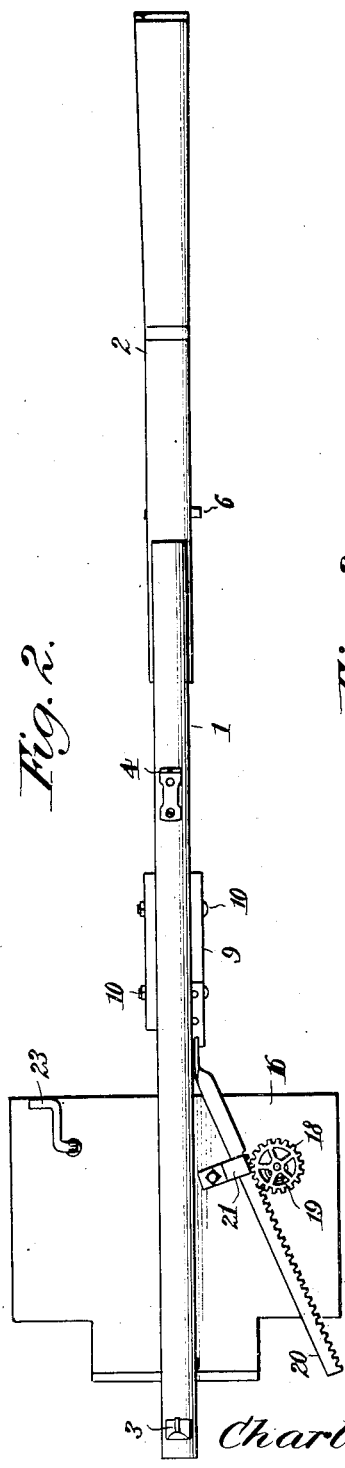
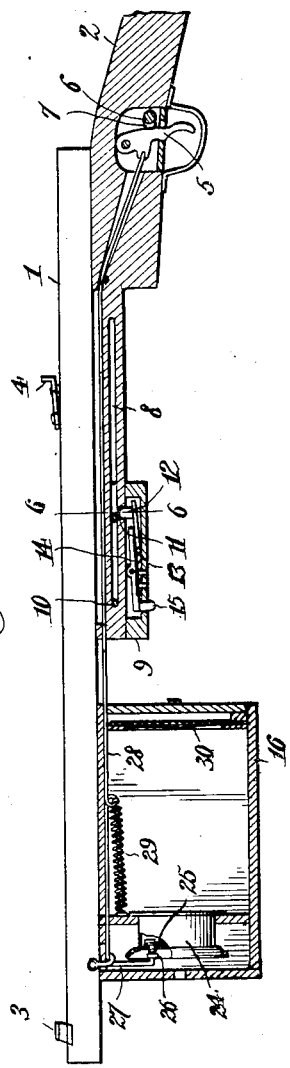
Witnesses:
C. Peinle, Jr.
M. L. Taft.
Inventor,
Charles R. Pfander.
By Victor J. Evans,
Attorney.

C. R. PFANDER.
REPEATING PUMP GUN CAMERA.
APPLICATION FILED AUG. 2, 1915.
1,190,000.
Patented July 4, 1916.
2 SHEETS—SHEET 2.
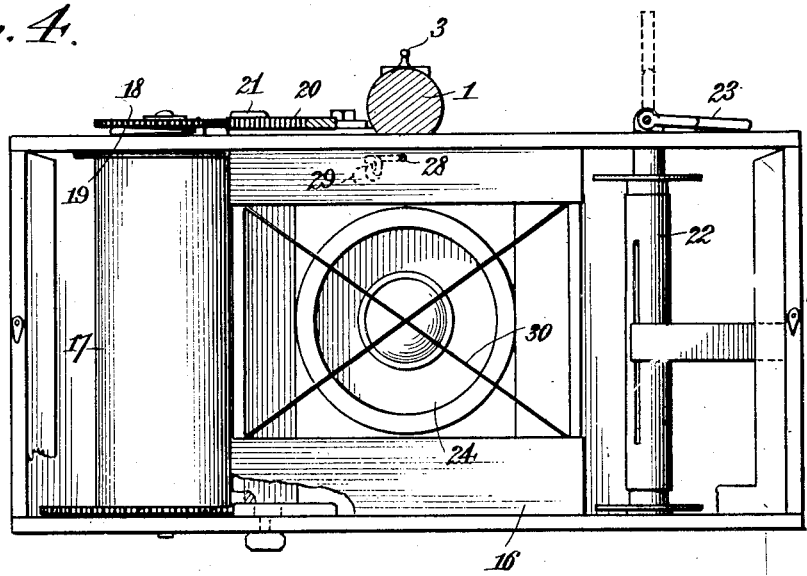
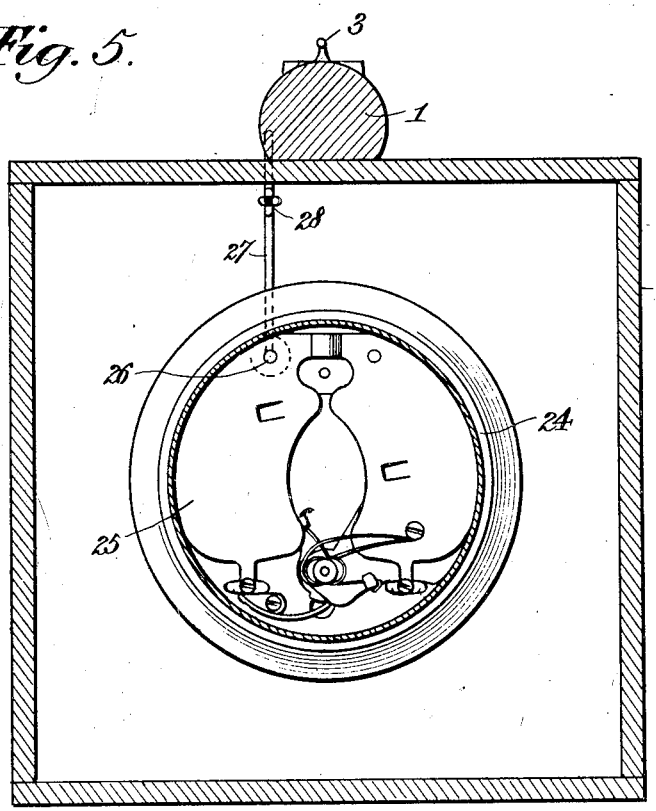
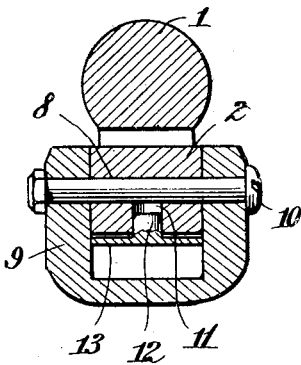
Inventor,
Charles R. Pfander.
By Victor J. Evans,
Attorney.
Witnesses
C. Peinle, Jr.
M. L. Toft.

UNITED STATES PATENT OFFICE.

CHARLES R. PFANDER, OF HILL CITY, SOUTH DAKOTA.

REPEATING PUMP-GUN CAMERA.

1,190,000.  Specification of Letters Patent.  Patented July 4, 1916.

Application filed August 2, 1915. Serial No. 43,257.

*To all whom it may concern:*

Be it known that I, CHARLES R. PFANDER, a citizen of the United States, residing at Hill City, in the county of Pennington and State of South Dakota, have invented new and useful Improvements in Repeating Pump-Gun Cameras, of which the following is a specification.

This invention relates to repeating pump gun cameras and it consists in the novel features hereinafter described and claimed.

An object of the invention is to provide a camera especially adapted to be used for taking negatives or views of objects in motion.

With this object in view the device includes a camera proper, which is attached to the barrel portion of an imitation gun. The gun is provided with a stock and trigger and means is provided upon the gun for operatively connecting the trigger with the shutter releasing device of the camera proper. A grip is slidably mounted along the barrel of the gun, and means operatively connects the said grip with the film roll of the camera proper, whereby the said roll is turned and the film is wound thereon as the grip is moved longitudinally of the barrel. The gun barrel is provided with suitable sights and these register with cross threads placed in the camera proper and the said threads leave cross lines upon the film when the same is exposed and the point of intersecting of the said lines indicates upon the picture the accuracy of aim exercised at the time that the film is exposed.

In the accompanying drawing:—Figure 1 is a side elevation of the repeating pump gun camera. Fig. 2 is a top plan view of the same. Fig. 3 is a longitudinal sectional view of the forward portion of the same. Fig. 4 is a rear elevation of the camera proper showing parts broken away and parts removed. Fig. 5 is a transverse sectional view of the forward portion of the camera proper. Fig. 6 is a transverse sectional view of the gun cut on the line 6—6 of Fig. 3.

The gun which constitutes a part of the repeating pump gun camera includes a barrel 1 which is mounted upon a stock 2. Front and rear sights 3 and 4 respectively are mounted upon the barrel 1. A trigger 5 is pivotally mounted in the stock 2 and a safety slide 6 is movably mounted in the stock 2 behind the trigger 5. The said stop 6 is provided at its side with a cam portion 7 (see Fig. 3) which, when moved behind the trigger 5 prevents the trigger from being pulled or swung upon its pivot. It is to be understood that the slide 6 moves longitudinally transversely across the stock 2 and when the cam portion 7 is moved beyond the edge of the trigger 5, the said trigger may be freely swung upon its pivotal connection with the said stock. The forward portion of the stock 2 is slotted as at 8 and the said slots extend parallel with the long dimension of the barrel 1. A grip 9 is slidably mounted upon the forward portion of the stock 2 and the said grip is provided with cross bolts or screws 10, which lie in the slot 8 and which are adapted to move along the said slots as the grip 9 is moved along the stock and the said bolts or screws serve as means for limiting the sliding movement of the grip. The stock 2 is provided at its forward portion and under the slot 8 with an opening 11 adapted to receive a pin 12. The pin 12 is mounted upon a spring 13 located in the grip 9. A lever 14 is fulcrumed in the grip 9 and one end portion of the said lever extends along the upper side of the spring 13. The lever 14 is provided at its forward end with a lug 15 which extends down through the lower side of the grip 9. When the pin 12 is in engagement with the opening 11, the grip 9 is held in a locked or fixed position with relation to the stock 2 as shown in Fig. 3 of the drawing. When it is desired to move the grip 9 along the forward portion of the stock 2 an operator presses the lug 15 in an upward direction whereby the lever 14 is swung upon its fulcrum, and the rear end of the said lever depresses the rear end of the spring 13 whereby the pin 12 is moved in a downward direction out of the opening 11, and consequently the grip 9 is rendered free to be moved along the forward portion of the stock 2.

A camera 16 is attached to the under forward portion of the barrel 1 and the said camera is provided with a film roll 17 of the usual pattern. A gear wheel 18 is turnably mounted upon the upper end of the shaft of the roll 17 and carries a spring pressed pawl 19, which is engageable with the shaft of the roll 17 to turn the said roll in one direction. A rock bar 20 is pivotally connected at one end with the grip 9 and the teeth of the rock bar 20 mesh with the teeth of the gear wheel 18 as most clearly shown in Fig. 2 of the drawing. A guide 21 is mounted upon the body of the camera 16, and the rock bar 20 is arranged to move under the said guide. The camera proper is further provided with a journaled shaft 22 upon which the film roll (not shown) is originally placed. From the shaft 22 the film is extended around the roll 17 and is wound on the said roll 17 after each exposure. A handle 23 is pivotally connected with the upper end of the shaft 22 and may lie flat against the top of the camera 16 when not in use. A lens holder 24 is mounted in the forward portion of the camera body 16 and the said lens holder is provided with shutters 25 of usual pattern. The shutters 25 are provided with spring pressed buttons 26 of usual form and which are disposed at the forward portion of the lens holder 24. A lever 27 is fulcrumed at the forward portion of the barrel 1 and the lower end of the said lever lies in front of and against one of the buttons 26. A flexible wire 28 is connected at one end with the lever 27 and extends back under the barrel 1 and is connected at its rear end with the trigger 5. A spring 29 is connected at one end with the wire 28 and at its other end with a fixed portion of the camera body 16, and the said spring is under tension with a tendency to hold the wire 28 and the trigger 5 connected thereto, at forward positions. Cross threads 30 are mounted in the body 16 of the camera and are located just in front of the portion of the film which is exposed when the shutters 25 are operated.

The operation of the repeating pump gun camera is as follows: Assuming that there is a portion of the negative film in position in the camera behind the shutters and it is desired to take a negative of an object in motion, the gun is pointed at the object and the sights 3 and 4 are brought into alinement at that point of the object which it is desired should be at the center of the picture when developed. The trigger 5 is then pulled, whereby the wire 28 is moved longitudinally against the tension of the spring 29 and the lever 27 is swung upon its fulcrum and one of the buttons 26 is pushed so that the shutters 25 are operated or swung in the usual manner. This, of course, permits a cone of light to enter the body 16 through the lens and lens holder, and a picture of the object is taken upon the film. The cross threads 30 leave cross marks upon the film inasmuch as they intercept rays of the cone of light, and the point of intersection of the said cross marks upon the picture will occur at the same point at which the sight is taken along the sights 3 and 4 upon the object. The operator then pushes the lug 15 in an upward direction, whereby the grip 9 is released upon the stock 2 and the said grip is moved in a rearward direction and carries with it the rock bar 20. Inasmuch as the teeth of the rock bar 20 are in engagement with the teeth of the gear wheel 18 the said gear wheel is turned and its spring pressed pawl 19 encounters the shaft of the roll 17 and the roll is turned, whereby the negative just taken is wound upon the said roll 17. This leaves an unused portion of the film in alinement with the lens and lens holder and when the grip 9 is moved in a forward direction, and the pin 12 is permitted to enter the opening 11, the parts are in position for the operator to take another picture.

From the above description taken in connection with the accompanying drawing, it will be seen that a camera pump gun of simple structure is provided and that the same may be easily and quickly used or manipulated for taking the picture of an object in motion, and inasmuch as the cross marks upon the picture indicate the point on the object at which the gun is directed, this serves as a means for testing the skill of the operator in taking quick sight at the object while in motion. When the device is not in use, the saftey slide 6 may be moved in the stock 2 so that the cam portion 7 thereof is positioned behind the trigger 5 and consequently, the trigger cannot be pulled and this prevents the possibility of spoiling a portion of the film, by exposing the same accidentally.

Having described the invention, what is claimed is:—

1. A photographing apparatus comprising a camera, a structure attached thereto, a trigger pivoted to the structure, shutters mounted in the camera, means operatively connecting the shutters with the trigger and cross threads located in the camera in front of the field of exposure.

2. A photographing apparatus comprising a camera, a structure attached thereto, a trigger mounted upon the structure, shutters mounted in the camera, means operatively connecting the shutters with the trigger, a grip slidably mounted upon the structure, means for locking the grip against sliding movement, and means operatively connecting the grip with the film roll of the camera.

3. A photographing apparatus comprising a camera, a structure attached thereto, a trigger pivotally mounted upon the structure, shutters mounted in the camera, means operatively connecting the shutters with the trigger, and a safety slide mounted upon the structure and having a portion engageable with the trigger to hold the same against swinging movement.

4. A photographing apparatus comprising a camera, a structure attached thereto, a trigger mounted upon the structure, shutters located in the camera, means operatively connecting the shutters with the trigger, cross threads located in the camera in advance of the field of exposure, a grip slidably mounted upon the gun, and means operatively connecting the grip with the film roll of the camera.

In testimony whereof I affix my signature in presence of two witnesses.

CHARLES R. PFANDER.

Witnesses:
 A. T. MURRAY,
 G. W. COATS.